(12) United States Patent
Umemoto

(10) Patent No.: US 6,369,558 B2
(45) Date of Patent: Apr. 9, 2002

(54) SWITCHING REGULATOR

(75) Inventor: Kiyotaka Umemoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/884,113

(22) Filed: Jun. 20, 2001

(30) Foreign Application Priority Data

Jun. 23, 2000 (JP) ............................................ 12-189150

(51) Int. Cl.$^7$ ................................................. G05F 1/40
(52) U.S. Cl. ...................................... 323/282; 323/284
(58) Field of Search ................................ 323/287, 282, 323/288, 284

(56) References Cited

U.S. PATENT DOCUMENTS 4,065,713 A * 12/1977 Pollmeier ..................... 323/287

* cited by examiner

*Primary Examiner*—Shawn Riley
(74) *Attorney, Agent, or Firm*—Mattingly, Stanger & Malur, P.C.

(57) ABSTRACT

A switching regulator includes a series circuit of a resistor, a diode and a speed-up capacitor, connected in parallel to a voltage dividing resistor of a voltage dividing resistor circuit for output voltage detection, which is connected to an output terminal of the switching regulator.

7 Claims, 3 Drawing Sheets

SWITCHING REGULATOR

BACKGROUND OF THE INVENTION

1. Field of the Invention

The present invention relates to a switching regulator and, particularly, to a switching regulator for use in a D.C. power source circuit of an electronic device, which is capable of restricting overshoot of an output voltage of the D.C. power source at a time when the switching regulator is actuated to allow the D.C. power source circuit to generate a desired stabilized power source voltage substantially simultaneously with a turning ON of the power source circuit, while preventing the power source circuit from oscillating.

2. Description of the Prior Art

In jorder to efficiently obtain a stabilized power source voltage of a conventional power source circuit of an electronic device such as a portable audio device, a portable personal computer, a PHS, a portable telephone set or the like, the power source circuit utilizes a switching regulator.

FIG. 3 is a circuit diagram of an example of a conventional switching regulator. In FIG. 3, a switching regulator 10 includes an error amplifier (Err) 11, a reference voltage generator circuit 12, a PWM pulse generator circuit 13, a driver 14, a switching circuit 15 and a voltage dividing resistor circuit 17. The switching circuit 15 is composed of a P channel MOSFET Q1 having an emitter connected to an input power source line +Vcc and a Schottky diode D connected between the P channel MOSFET Q1 and ground GND.

A power capacitor C has one terminal connected to an output terminal 16 of the switching regulator 10 and the other terminal grounded (GND). An inductor L is connected between the output terminal 16 and a junction between the MOSFET Q1 and the Schottky diode D. An inductance of the inductor L is in the order of 10 $\mu$H and a capacitance of the capacitor C is about 150 $\mu$F. A voltage dividing resistor circuit 17 for detecting a voltage of the output terminal 16 has one terminal connected to the output terminal 16 and the other terminal grounded (GND). A voltage Vs detected by the voltage dividing resistor circuit 17 is fedback to one of input terminals of the error amplifier 11. The voltage Vs detected by the voltage dividing resistor circuit is compared by the error amplifier 11 with a reference voltage Vref applied to the other input terminal of the error amplifier 11 and an error voltage VE between the detected voltage Vs and the reference voltage Vref is inputted to the PWM pulse generator circuit 13 as an error detection signal. The PWM pulse generator circuit 13 is usually constructed with a comparator (COM) 13a and a sawtooth wave generator circuit 13b. In the PWM pulse generator circuit 13, a sawtooth voltage from the sawtooth wave generator circuit 13b is compared with the error voltage VE so that the sawtooth wave is sliced by the error voltage VE to produce a PW pulse having width determined by the error voltage VE. The PMW pulse thus generated is inputted to the driver 14. The driver 14 drives the MOSFET Q1 to turn it ON and OFF for a time period corresponding to the width of the PWM pulse to generate a reduced voltage, or a boosted voltage obtained by fly-back pulse when the switching regulator is of the booster type, which is applied to the output terminal 16 through the inductance L.

Incidentally, the Schottky diode D is a flywheel diode for returning current flowing from the inductance L when the MOSFET Q1 is turned OFF to the inductance L.

With this construction, the MOSFET Q1 is ON-OFF controlled by the driver 14 such that the voltage Vs obtained by the voltage dividing resistor circuit 17 becomes coincident with the reference voltage Vref. Therefore, the output voltage of the MOSFET Q1 at the output terminal 16 is stabilized to a constant voltage Vo.

The voltage dividing resistor 17 for detecting the output voltage of the switching regulator is composed of a resistor R1 connected to the output terminal 16 of the switching regulator, a resistor R2 connected in series with the resistor R1 and a speed-up circuit. The speed-up circuit includes a CR time constant circuit 17a for setting a gain and functions to reduce a time period from a time at which the switching regulator 10 is started to a time at which the operation of the switching regulator enters into a voltage stabilizing mode. The CR time constant circuit 17a is composed of a series circuit of a resistor R3 and a capacitor C1 and is connected in parallel to the resistor R1 of the voltage dividing resistor circuit 17. The CR circuit 17a functions to increase a gain (voltage dividing ratio) of a rising portion of the detection voltage Vs to thereby rise the detection voltage Vs at high speed in an initial operating stage of the switching regulator. As a result, the output voltage is increased to the aimed voltage Vo rapidly.

At this time, an impedance determined by a time constant given by the resistor R3 and the capacitor C1 is connected in parallel to the resistor R1, so that the switching regulator operates at a response speed obtained thereby. Therefore, the time required to obtain the aimed output voltage Vo is shortened.

Incidentally, Lo depicts a load and a capacitance of the capacitor C1 is about 5.6 $\mu$F. When the operation of the switching regulator becomes the voltage stabilizing state (normal state), a terminal voltage of the capacitor C1 when charged is substantially maintained at the terminal voltage of the resistor R1. It is usual that the resistor R3 has a value smaller than a half of the value of the resistor R1 and the impedance of the series circuit of the resistor R3 and the capacitor C1 at the starting time of operation of the switching regulator is smaller than the half value of the resistor R1.

However, with the provision of the CR time constant circuit 17a, there is a problem of occurrence of overshoot in a rising portion of the output voltage of the power source. In order to solve the overshoot problem, the time constant of the CR time constant circuit 17a is increased by increasing the capacitance of the capacitor C1, which is generally referred to as the "speed-up capacitor", to relax a voltage change of the rising portion of the detection voltage Vs. However, when the capacitor C1 having increased capacitance is used, the phase advance is increased with increase of the switching frequency of the switching regulator, so that there is another problem of oscillation of the switching regulator.

In order to solve the circuit oscillation problem, it is usual that the effective width of the output pulse of the PWM pulse generator circuit 13 at the starting time of the switching regulator is increased gradually or an amplifier having a low operating speed is used as the error amplifier 11. In the former case, there is a problem that the size of the control circuit at the starting time of the switching regulator becomes large and, in the latter case, there is a problem that the high response speed to the output voltage regulation is lost.

SUMMARY OF THE INVENTION

The present invention was made to solve the above described problems of the conventional technique and an object of the present invention is to provide a switching regulator capable of restricting an overshoot of an output voltage of the switching regulator at a starting time thereof and of generating a predetermined, stabilized power source voltage immediately after a power source is turned ON, while preventing oscillation of the power source circuit.

In order to achieve the above object, a switching regulator according to the present invention, in which a portion or a whole portion of a voltage outputted from an output terminal of a D.C. power source to a load through a voltage divider circuit connected in parallel to the load is fed back to one of inputs of an error amplifier of the switching regulator, a predetermined constant voltage is applied to the other input of the error amplifier, the voltage +Vcc of the D.C. power source is switched by a transistor according to an error detection signal obtained from the error amplifier and a predetermined, stabilized voltage is generated at an output terminal of the power source circuit, is featured by comprising a series circuit of a resistor, a diode and a capacitor (referred to as a "speed-up capacitor", hereinafter) for shortening a time period from a time at which the power source circuit is turned ON up to a time at which the switching regulator enters into a voltage stabilizing operation is connected in parallel to a voltage dividing resistor circuit provided on the side of the output terminal.

With the provision of the series circuit of the resistor, the diode and the speed-up capacitor connected in parallel to a voltage dividing resistor (R1) of the voltage dividing resistor circuit provided on the side of the output terminal ot the power source circuit, the charging of the speed-up capacitor is started from a time when a terminal voltage of the resistor R1 becomes Vf or more, which is necessary to turn the diode of the series circuit ON. The maximum charging voltage of the speed-up capacitor is a difference between the terminal voltage of the resistor R1 during a time for which the voltage stabilizing operation is performed and Vf, so that the charging of the speed-up capacitor of the series circuit is gradually performed even when a capacitance of the speed-up capacitor is small. Therefore, the voltage dividing ratio of the voltage dividing resistor circuit is gradually changed.

As a result, it becomes possible to restrict the overshoot of the output voltage at the starting time of the operation of the switching regulator without risk of circuit oscillation to thereby start the operation of the switching regulator immediately after the power source is turned ON.

DETAILED DESCRIPTION OF THE PREFERRED EMBODIMENTS

Figure 1:
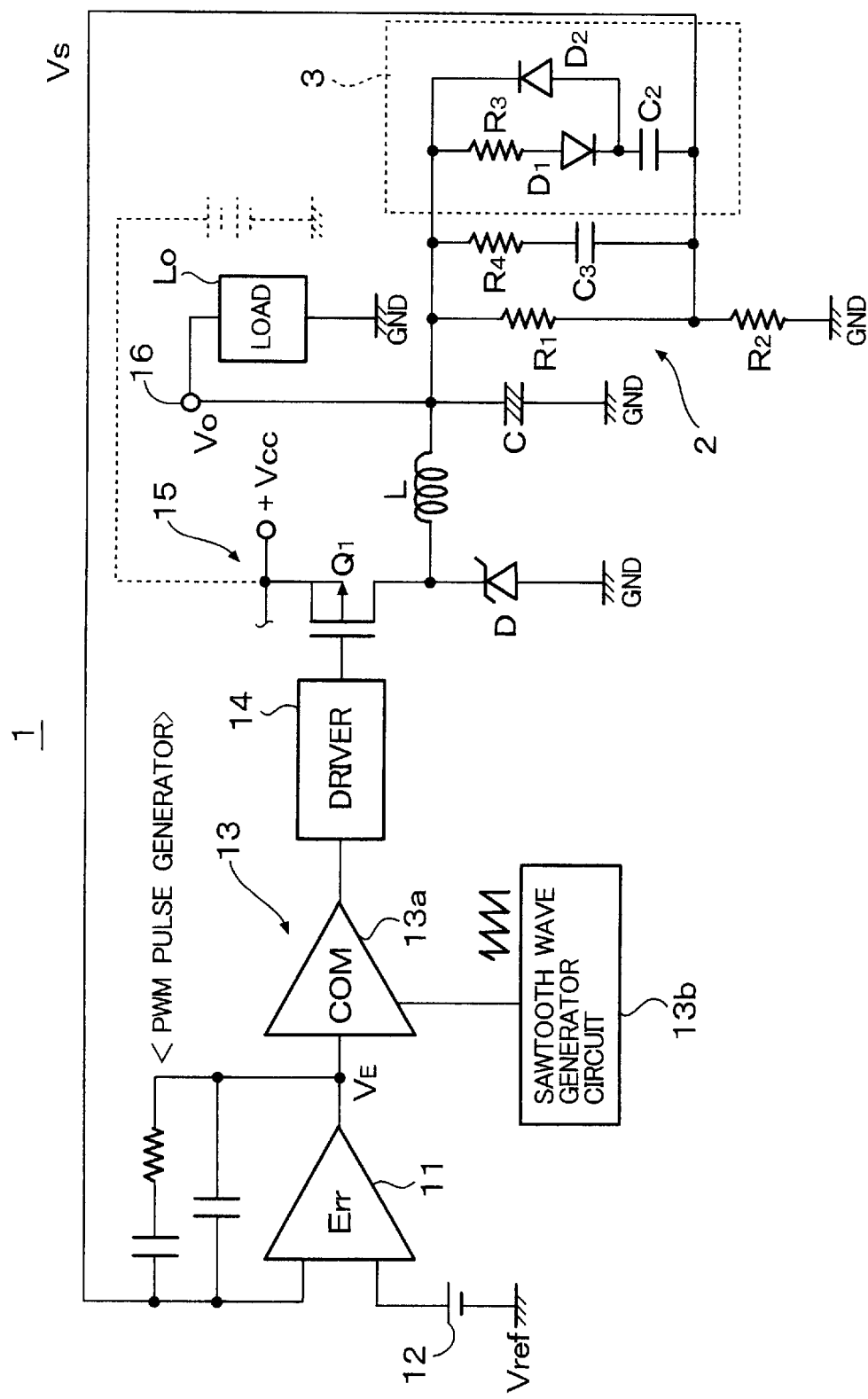
FIG. 1 is a block circuit diagram of a switching regulator according to an embodiment of the present invention.

In FIG. 1, a switching regulator 1 according to the present invention comprises a voltage dividing resistor circuit 2 for detecting an output voltage of the switching regulator 1. The voltage dividing resistor circuit 2 includes a series connection of resistors R1 and R2, a series connection of a resistor R4 and a capacitor C3, which is connected in parallel to the resistor R1, similarly to the conventional switching regulator shown in FIG. 3. The present switching regulator further includes a speed-up circuit 3 connected in parallel to the parallel circuit of the resistor R4 and the capacitor C3. The speed-up circuit 3 includes a series circuit of a resistor R3, a diode D1 forward-connected with respect to a voltage at an output terminal 16 of the switching regulator and a speed-up capacitor C2. The speed-up circuit 3 further includes a diode D2 connected in parallel to the series connection of the resistor R3 and the diode D1 in an opposite direction to the direction of the diode D1.

In an example, the resistor R1 is 20 kΩ, the resistor R2 is 12 kΩ, the resistors R3 and R4 are 3.3 kΩ, respectively, the capacitor C3 is 2.2 nF and the speed-up capacitor C2 is 0.1 $\mu$F. The capacitor C3 and the resistor R4 constitute a phase compensation circuit for preventing oscillation of the switching regulator circuit, which may be provided on demand.

Figure 3:
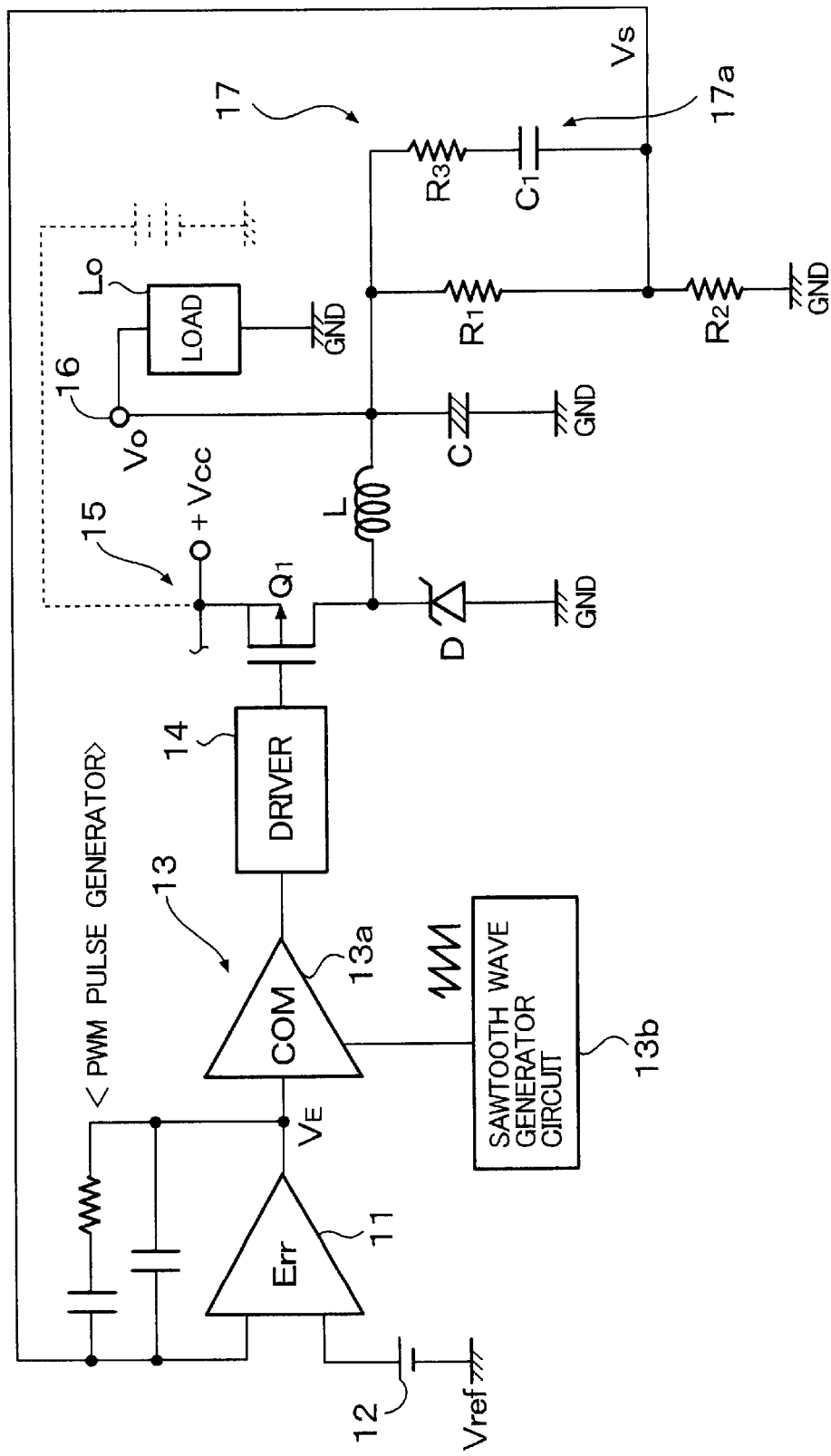
FIG. 3 is a block circuit diagram of a conventional switching regulator.

The connecting order of the resistor R3, the diode D1 and the speed-up capacitor C2 of the speed-up circuit 3 is not limited to that shown in FIG. 1. Incidentally, the constituting components of the switching regulator shown in FIG. 1, which are the same as those shown in FIG. 3, are depicted by the same reference numerals, respectively, without detailed description thereof.

It is assumed that, when the switching regulator 1 is operating in a voltage stabilizing operation mode, the voltage at the output terminal 16 of the switching regulator 1, which is a terminal voltage of the resistor R1 of the voltage dividing resistor circuit 2 Vf+$\alpha$. The output terminal voltage Vf+$\alpha$ is a value enough to charge the speed-up capacitor C2 when the diode D1 is turned ON.

The voltage Vf, which is a forward voltage drop between a base and an emitter (namely, a bias voltage at which the diode D1 is turned ON ), is about 0.7V, and $\alpha$, which is a voltage drop of the resistor R3 at the starting time of the switching regulator 1, is in a range 0V~1.3V in this embodiment. Therefore, Vf+$\alpha$ is about 2.0V. The D.C. power source voltage +Vcc is about 5.0V and the output voltage Vo of the power source circuit when the operation of the switching regulator 1 is in the voltage stabilizing mode is about 3.5V. Further, the capacitance of the speed-up capacitor C2 may be as small as about 0.1 $\mu$F since the voltage applied to the speed-up capacitor C2 is $\alpha$(=Vf+$\alpha$-Vf) at most and the charging thereof is performed gradually.

The output voltage characteristics of the switching regulator 1 will be described.

At the starting time of the switching regulator 1, the output voltage at the output terminal 16 is increased and the speed-up capacitor C2 is charged by the voltage at the terminal of the resistor R1 with which the diode D1 is turned ON. In an initial stage of the voltage stabilizing operation of the switching regulator, the capacitor C3 of the series circuit of the resistor R4 and the capacitor C3, which is connected in parallel to the resistor R1, is also charged to some extent. Thereafter, when the terminal voltage of the resistor R1 becomes Vf or a voltage higher than Vf by a and, thereby, the diode D1 is turned ON, the charging of the speed-up capacitor C2 is started through the resistor R3. Therefore, the series circuit of the resistor R3 and the speed-up capacitor C2 is connected in parallel to the resistor R1 and the detection voltage Vs becomes the output terminal voltage divided with an increased voltage dividing ratio of the resistor R2 to a synthesized impedance of the parallel circuit of the resistor R1, the series circuit of the resistor R4 and the capacitor C3 and the speed-up circuit 3, which is larger than the voltage dividing ratio of the resistor R2 to the resistor R1.

Therefore, the diode D1 is turned ON in a midway from the starting time of the operation of the switching regulator to a time at which the a voltage Vf or higher is applied to the resistor R1. With increase of the terminal voltage of the resistor R1 from Vf to (Vf+α), the speed-up capacitor C2 is slowly charged with a voltage difference of +α at maximum and the voltage dividing ratio is changed toward the normal voltage dividing ratio (R1:R2) in the voltage stabilizing mode. At this time, the detection voltage Vs for error control is generated depending on the charge voltage of the speed-up capacitor C2 and applied to the error amplifier 11, so that the control of the output voltage is performed toward the aimed voltage Vo. The capacitor C3 and the speed-up capacitor C2 are charged through the resistors R4 and R3, respectively, and, when the terminal voltage of the resistor R1 becomes (Vf+α) immediately before the normal operation mode of the switching regulator is started, the charging of the speed-up capacitor C2 is completed, so that the diode D1 is turned OFF to terminate the operation of the speed-up circuit 3 and the operation of the switching regulator 1 enters into the voltage stabilizing mode.

With the charging operation of the speed-up capacitor C2 with the voltage +α at maximum, there is substantially no overshoot on the output voltage of the switching regulator 1. In other words, the difference between the voltage with which the speed-up circuit 3 including the diode D1 starts the charging operation of the speed-up capacitor C2 and the terminal voltage of the resistor R1 in the normal state in which the voltage stabilizing operation is performed is set to a value with which no overshoot occurs. Incidentally, +α is in the order of several volts.

Figure 2:
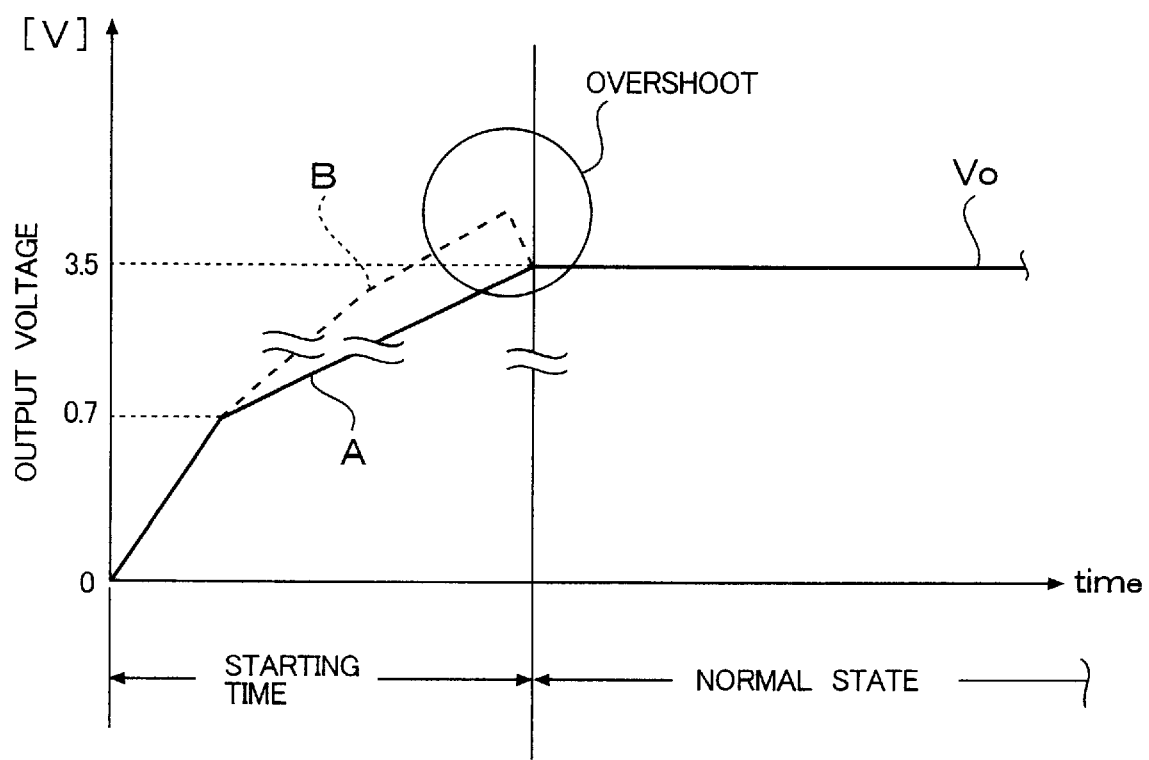
FIG. 2 illustrates a starting characteristics of the switching regulator shown in FIG. 1.

As a result, the output voltage of the switching regulator 1 changes along a line A including two line segments correspondingly to the change of the detection voltage Vs, as shown by a solid curve in FIG. 2. Incidentally, a curve B shown by a dotted line in FIG. 2 is a characteristics curve of the conventional switching regulator, which does not include the speed-up circuit 3.

Since the positive side terminal of the speed-up capacitor C2 when charged is connected to the output terminal 16 through the diode D2, the charge accumulated on the speed-up capacitor C2 is discharged through the diode D2 and the resistor R1 when the power source is turned OFF. In this case, the charge on the side of the capacitor C3 is discharged through the resistor R1.

When the stabilized output voltage becomes higher than the aimed voltage Vo when the switching regulator 1 is operating in the normal operating mode, the speed-up capacitor C2 of the speed-up circuit 3 is charged. Since, however, the charging of the speed-up capacitor is performed through the resistor R3, the value of the resistor R3 is selected such that the resistor R3 does not affect the stabilizing operation of the switching regulator. This is also true for the resistor R3 of the conventional speed-up circuit.

The terminal voltage of the voltage dividing resistor R1 connected to the output terminal 16 of the switching regulator 1 can be increased by connecting one or more diodes in series with the diode D1. In such construction, the terminal voltage can be set to a value equal to or smaller than (nvf+α) where n is the number of diodes connected in series with the diode D1. Although voltage Vf of a diode, which is necessary to turn the diode D1 ON, is usually about 0.7V, it is possible to reduce Vf to about 0.2V if the diode D1 is a Schottky diode.

Although the switching regulator of the present invention has been described with reference to the embodiment of the voltage drop type, the present invention can be applied to the boosting type DC/DC converter.

What is claimed is:

1. A switching regulator including a voltage divider circuit, an error amplifier and a transistor, in which a portion or a whole portion of a voltage outputted from an output terminal of a D.C. power source to a load through said voltage divider circuit connected in parallel to said load is fed back to one of inputs of said error amplifier, a predetermined constant voltage is applied to the other input of said error amplifier, the voltage of said D.C. power source is switched by said transistor according to an error detection signal obtained from said error amplifier and a predetermined, stabilized voltage is generated at an output terminal of said switching regulator, said switching regulator comprising:

a first series circuit of a first resistor, a first diode and a first capacitor for shortening a time period from a time at which said D.C. power source is turned ON up to a time at which said switching regulator enters into a voltage stabilizing operation, said series circuit being connected in parallel to a voltage dividing resistor of said voltage dividing resistor circuit provided on the side of said output terminal.

2. A switching regulator as claimed in claim 1, wherein said voltage dividing resistor is connected to said output terminal, a terminal voltage of said voltage dividing resistor when said switching regulator is operating in a voltage stabilizing mode is higher than a bias voltage at which said diode is turned ON and a difference between the terminal voltage of said voltage dividing resistor at a time when said diode is turned ON and a charging of said capacitor is started and the terminal voltage of said voltage dividing resistor during a time for which the operation of said switching regulator is in the voltage stabilizing mode is a value with which an overshoot of a voltage applied to said load is restricted.

3. A switching regulator as claimed in claim 2, further comprising a second series circuit of a second resistor and a second capacitor, said second series circuit connected in parallel to said voltage dividing resistor for preventing an oscillation of said switching regulator.

4. A switching regulator as claimed in claim 3, wherein said first diode is connected in forward direction with respect to the voltage at said output terminal of said switching regulator, further comprising a second diode for discharging said first capacitor.

5. A switching regulator as claimed in claim 4, wherein said second diode is connected between a positive terminal of said first capacitor charged and said output terminal of said switching regulator and connected in opposite direction with respect to the voltage at said output terminal.

6. A switching regulator as claimed in claim 4, wherein a value of said first resistor of said first series circuit is smaller than a half of a value of said voltage dividing resistor.

7. A switching regulator as claimed in claim 6, further comprising a PWM pulse generator circuit responsive to the output signal of said error amplifier for generating a PWM pulse, a smoothing inductor provided between said output terminal of said switching regulator and an output terminal of said transistor, a fly-back diode and a third capacitor, said fly-back diode being connected between said output terminal of said transistor and ground, said third capacitor being connected between said output terminal of said switching regulator and ground, wherein said transistor is switched according to the PWM pulse.

* * * * *